Nov. 10, 1953　　　　R. W. BROWN　　　　2,659,020
MECHANISM FOR ADJUSTABLY CORRELATING TOOL FEED
WITH RATE OF CUTTING OF MACHINE TOOLS
Filed Nov. 1, 1950　　　　　　　　　　　　　2 Sheets-Sheet 1

Inventor
Roger W. Brown

Inventor
Roger W. Brown

Patented Nov. 10, 1953

2,659,020

UNITED STATES PATENT OFFICE 2,659,020

MECHANISM FOR ADJUSTABLY CORRELATING TOOL FEED WITH RATE OF CUTTING OF MACHINE TOOLS

Roger W. Brown, Windsor, Vt., assignor to Cone Automatic Machine Company Inc., Windsor, Vt., a corporation of Vermont Application November 1, 1950, Serial No. 193,485

4 Claims. (Cl. 310—95)

This invention relates to drive mechanism for machine tools and has for an object to provide for feed of a tool relative to the work where the tool or the work be moved in feed direction at a feed rate adjustably proportional to the speed of rotation of a work or tool spindle.

A further object is to provide for continuous adjustment of such proportional rate under operator control.

The invention is exemplified in this application as applied to a lathe where the work piece is carried by a rotary spindle and the tool is moved to produce the feed, and also as applied to a milling machine where the tool is carried by a rotary spindle and the work is moved relative to the tool to produce the feed.

Referring to the drawings.

Figures 1, 2:
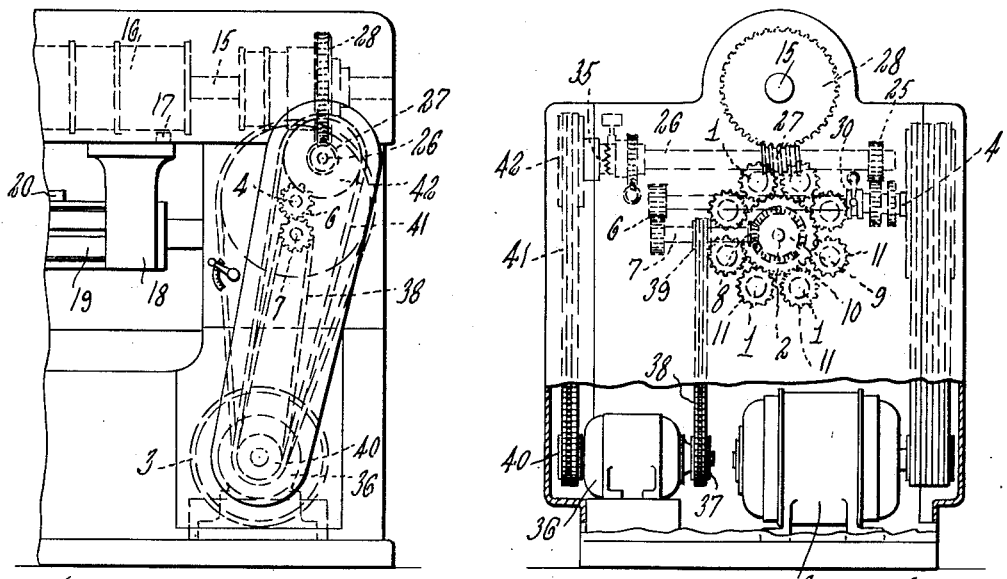
Figure 1 is a fragmentary front elevation of a multiple spindle lathe embodying the invention.
Figure 2 is an end elevation partly broken away and in section of the machine shown in Figure 1.

Referring first to Figures 1 and 2, there is shown portions of a multiple spindle automatic lathe of the general type shown in the Miller et al. Patent No. 2,456,139, granted December 14, 1948, in which there are a plurality of rotary work spindles 1 arranged in circular array about the axis of a central shaft 2. These work holders are carried by a suitable carrier which is indexed so as to bring each of the spindles successively into one position. Each of the work spindles is rotated, a motor 3 being provided for the purpose, this motor driving a shaft 4. This shaft 4 is connected through gearing at 6 with a shaft 7 provided with a bevel gear 8 meshing with a bevel gear 9 on the shaft 2 which extends through the work spindle carrier at the left end of the machine (not shown). This shaft 2 carries a large gear 10 which meshes with smaller gears 11, each carried by one of the work spindles. As usual with machines of this type, a fast motion drive is taken from the main motor and serves to actuate various tool carriers during their idle retracting motions when moving away from the work and during motions from retracted positions toward contact with the work. Further inward motion of the tools which produces the cutting effect is derived from a slow speed drive, which is more particularly concerned in connection with the present invention.

The motions of the various tools are produced from the rotation of an overhead cam shaft 15 which is provided with a series of cam drums thereon. One of these cam drums shown at 16 in Figure 1 is provided with suitable cams (not shown) which actuate a cam follower roll 17 on a bracket 18 which is caused to move a cylindrical tool support 19 axially. To the periphery of the support 19 various end working tools may be attached in position to operate on work carried by work spindles at selected index stations. One of these tool carriers is indicated generally at 20.

There may also be various front and back tool slides, not shown herein, but shown in the Miller et al. patent to which reference has been made, and which are also given their feed and retracting motions by rotation of the cam shaft 15.

The rapid or idle motions of the various tool carriers are derived, as before noted, from the rotation of the motor 3, through a set of gearing at 25 (see Figure 2) leading to a worm shaft 26 having a worm 27 thereon meshing with a worm wheel 28 carried by the cam shaft 15. A clutch 30 may be opened to disconnect the drive through the gears 25 when the working motion of the tools is to be effected, and this working or slow motion, is derived by rotation of the worm shaft 26 through a clutch at 35 from a variable speed control clutch at 36. This clutch 36 has a drive member 37 connected as through a belt 38 with a pulley 39 on the shaft 7, the speed of rotation of the pulley 37 then being directly produced by the rotary drive for the various spindles, so that the speed of the pulley 37 is always directly proportional to the speed of rotation of the work spindles and at a fixed ratio thereto.

The member 36 also has a driven pulley 40 which derives its motion from the rotation of the pulley 37, but, as will later more fully appear, at a controlled variable ratio. The pulley 40 drives the shaft 26 through means such as a belt connection 41 and the pulley 42.

The member 36 is a variable proportional clutch, the speed ratio of which is controlled at will from an outside source. One commercial type of mechanism which is useful for this purpose comprises a magnetic drag mechanism shown in Figures 3 and 4. Referring to Figure 4, at 50 is illustrated a driving shaft to which the driving pulley 37 is attached, and at 51 in alinement with the shaft 50, is a driven shaft to which the pulley 40 is attached. These are suitably mounted in ball bearings in a casing 53. Keyed to the shaft 50 is a spider 54 having a ring 55 of magnetic material such as iron, which surrounds a drum 56 which is keyed to the driven shaft 51. This drum 56 has a series of alternate pole pieces 57 and 58 which are energized through energization of a solenoid 59 placed between the pole pieces 57 and 58 and arranged coaxially to the shafts 50 and 51. When this solenoid 59 is energized, a magnetic drag is established between the rotary spider 54 and the pole pieces which produces a magnetic clutch coupling between the drive and driven portions. Where this energization is large, this magnetic drag is such as to effectively couple the spider and drum for simultaneous rotation. Where this energization is smaller, more or less slip occurs between these parts depending upon the extent of such energization.

Power for controlling such energization is derived from a pair of alternating current generators each comprising a pair of stationary permanent magnets 60 (see Figure 4), a pair of collector coils 61, and a toothed rotor 62, the toothed rotor being carried by the shafts 50 and 51, respectively. Rotation of these rotors produces a voltage proportional to the speed of rotation of its shaft, and current flow in each coil 61 which is rectified through the two two-way rectifiers 65 and 66, shown in Figure 3, the direct current passing to opposite ends of a potentiometer 660, the slider of the potentiometer and the mid-point of the opposite side of the circuit being connected to a control box 68.

The control box 68 contains a Wheatstone bridge control mechanism which receives energy from power leads 70 and 71 and delivers a controlled direct current through leads 72 and 73 to the brushes 74 and 75, contacting the slip rings 76 and 77, which are connected to opposite terminals of the solenoid 59. This bridge mechanism, as shown, comprises a rectifier 80, one terminal 81 of which is connected to the lead 73 through the arm 82 of a rheostat 83 and is connected to the lead 72 through the field coil 84 of a small reversible direct current motor, the armature 85 of which is connected as through worm gear reduction 86 to the arm 82 of the rheostat 83. Any unbalance of the system, due to changes in setting of the potentiometer 660, will cause rotation of the armature 85 in a correcting direction to change the setting of the arm 82 of the rheostat 83 until balance is reached, changing of the rheostat arm 82 changing the excitation of the solenoid 59 and the proportionate speed of the driven shaft 51 to the speed of the drive shaft 50, following up adjustment of the potentiometer 660. There is thus produced a variable control of the rate of feed of the tool carriers with respect to the rate of rotation of the work-carrying spindles.

Figure 3:
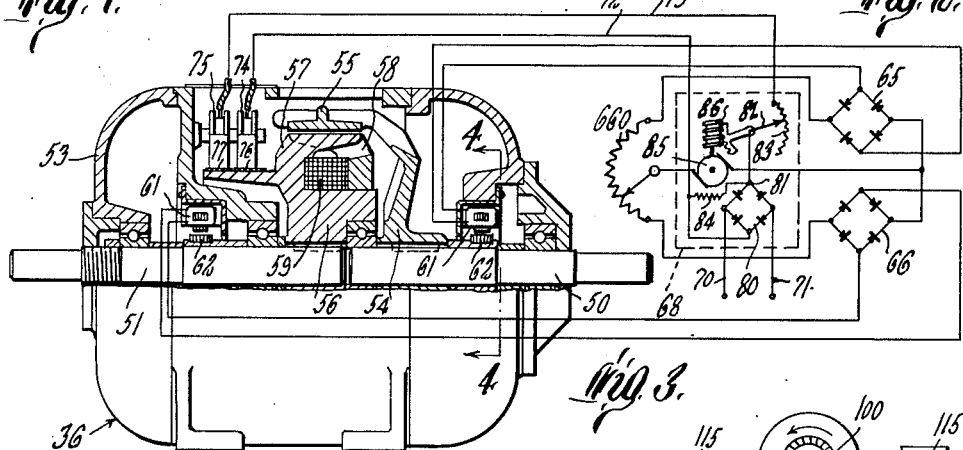
Figure 3 is a view partly in side elevation and partly broken away and in section of a portion of the variable proportional drive mechanism, its control connections being shown diagrammatically.
Figure 4:
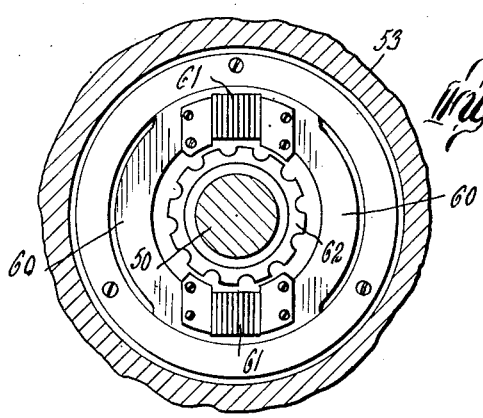
Figure 4 is a detail sectional view on line 4—4 of Figure 3.
Figure 5:
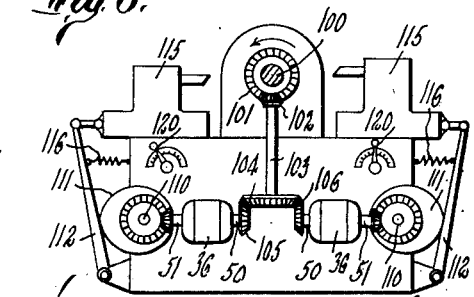
Figure 5 is a somewhat diagrammatic view of a single spindle lathe embodying the invention.

In Figure 5 application of this invention to a single spindle lathe has been illustrated, the single spindle 100 being driven from any suitable source and at any desired rate, this spindle, however driving through the bevel gears 101 and 102, the shaft 103 and the sets of bevel gears 104, 105, and 106, the input shafts 50 of a pair of the clutches such as are shown in Figure 3. The output shafts 51 of these mechanisms drive the cam shafts 110 through suitable gear trains, these cam shafts carrying cams 111 which serve through levers 112 to produce back and forth motion of the tool slides 115. As shown the tool slides are given their feed motions by springs 116, the rate of such feed being determined by the contours of the cams 111 and the rates at which these cams are turned by the shafts 51. These, however, are independently adjustably related to the speed of rotation of the work spindle 100, there being shown for the purpose control handles 120 each of which controls the potentiometer slider of one of these mechanisms.

Figure 6:
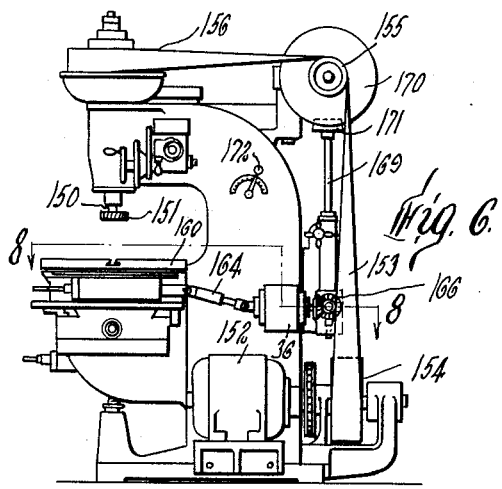
Figures 6 and 7 are side and rear elevations, respectively, of a vertical milling machine embodying the invention.
Figure 7:
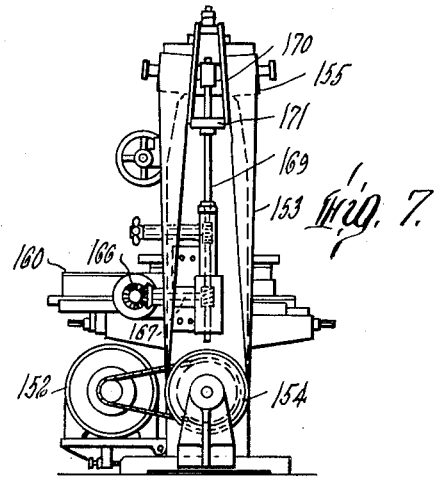

The same method of control may be applied where the tool is carried by the rotary spindle and the work is fed relative to the tool. This is exemplified, for example, in the milling machine shown in Figures 6 to 8, wherein the rotary spindle 150 supports the milling cutter 151 and is driven, as from the motor 152, through a suitable driving train such as the belt 153 and pulleys 154, 155 and 156.

Figure 8:
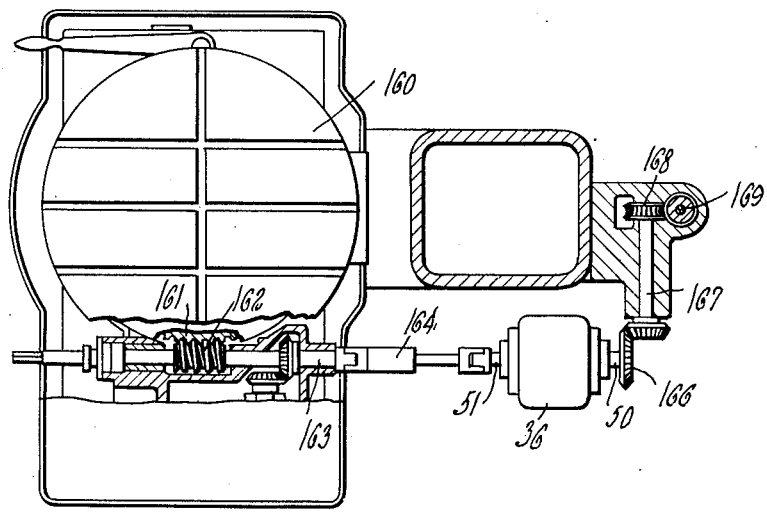
Figure 8 is a sectional view on line 8—8 of Figure 6.

The feed between the rotary tool and the work is determined by the speed of rotation of a work-carrying bed 160, which is shown in Figure 8 is provided with a worm wheel 161 meshing with a worm 162 on a drive shaft 163. This drive shaft is driven through a flexible drive connection of any suitable type at 164 from the driven shaft 51 of the variable speed clutch 36, the drive shaft 50 of which is driven from the spindle drive as through the meshing beveled gears 166 (see Figure 8), shaft 167, worm wheel 168 and worm shaft 169, which are driven from the pulley 155 through the bevel drive connections 170 and 171. By varying the drive ratio of the clutch 36 by control of its potentiometer 172 which may be located at any convenient place, it will be evident that the speed of work feed relative to the speed of rotation of the rotary tool may be adjusted as desired.

From the foregoing description of this invention, it will be evident to those skilled in the art that various changes and modifications may be made without departing from its spirit or scope.

I claim:

1. In combination, rotary means, moving means, and driving connections from said rotary means to said moving means for moving said moving means at a speed adjustably proportioned to the speed of rotation of said rotating means, said connections including a rotary driving member connected to said rotary means to be rotated thereby, a rotary driven member connected to said moving means to move said moving means by rotation of said driven member, an electrically energized clutch between said members, electrical means energized by rotation of said drive and driven member in proportion to the speeds of rotation of said drive and driven members, and means responsive to the relative energization of said electrical means in predetermined adjustable ratio controlling the energization of said clutch.

2. In combination, rotary means, moving means, and driving connections from said rotary means to said moving means for actuating said moving means at a speed proportional to the speed of rotation of said rotary means, said driving connections including a drive member connected to said rotary means, a driven member connected to said moving means, magnetic clutch connections between said drive and driven member including a clutch-energizing solenoid, an electric generator driven by said drive member, an electric generator driven by said driven member, means controlled by the relative voltages from said generators for energizing said solenoid, and operator-actuated means for varying such control.

3. In combination, rotary means, moving means, and driving connections from said rotary means to said moving means for actuating said moving means at a speed proportional to the speed of rotation of said rotary means, said driving connections including a drive member connected to said rotary means, a driven member connected to said moving means, magnetic clutch connections between said drive and driven member including a clutch-energizing solenoid, an electric generator driven by said drive member, an electric generator driven by said driven member, a source of electric power for energizing said solenoid, means for controlling said power, means responsive to relative voltages from said generators for controlling said power-controlling means, and operator-actuated means for modifying such last mentioned control.

4. In combination, rotary means, moving means, and driving connections from said rotary means to said moving means for actuating said moving means at a speed proportional to the speed of rotation of said rotary means, said driving connections including a drive member connected to be driven by said rotary means, a driven member connected to drive said moving means, magnetic clutch connections between said drive and driven member including a clutch-energizing solenoid, an electric generator driven by said drive member, an electric generator driven by said driven member, a source of electric power for energizing said solenoid, means for controlling said power, power-operated means responsive to relative voltages from said generators for controlling said power-controlling means, and a potentiometer operatively connecting said generators and having a movable slider in circuit with said power-controlling means and by the movement of which slider the relative effects of said generator voltages may be varied.

ROGER W. BROWN.

References Cited in the file of this patent

UNITED STATES PATENTS

| Number | Name | Date |
|---|---|---|
| 735,583 | Potter et al. | Aug. 4, 1903 |
| 772,477 | Potter et al. | Oct. 18, 1904 |
| 1,995,605 | Downing | Mar. 26, 1935 |
| 2,541,182 | Winther | Feb. 13, 1951 |
| 2,551,839 | Jaesche | May 8, 1951 |

FOREIGN PATENTS

| Number | Country | Date |
|---|---|---|
| 558,274 | Great Britain | Dec. 29, 1943 |